United States Patent [19]
Allard

[11] Patent Number: 5,505,488
[45] Date of Patent: Apr. 9, 1996

[54] INTEGRAL AIRBAG CUSHION RETAINER, FILTER AND DIFFUSER

[75] Inventor: John E. Allard, Ogden, Utah

[73] Assignee: Morton International, Inc., Chicago, Ill.

[21] Appl. No.: 415,709

[22] Filed: Apr. 3, 1995

[51] Int. Cl.[6] ................................................ B60R 21/28
[52] U.S. Cl. ........................ 280/740; 280/741; 280/728.2
[58] Field of Search ................................ 280/740, 736, 280/741, 728.2, 742

[56] References Cited

U.S. PATENT DOCUMENTS

| | | | |
|---|---|---|---|
| 3,819,205 | 6/1974 | Dunford et al. | 280/150 AB |
| 3,827,715 | 8/1974 | Lynch | 280/150 AB |
| 3,895,823 | 7/1975 | Stephenson | 280/150 AB |
| 3,984,126 | 10/1976 | Goetz et al. | 280/740 |
| 4,101,146 | 7/1978 | Oehm | 280/731 |
| 4,167,276 | 9/1979 | Bell et al. | 280/731 |
| 4,902,036 | 2/1990 | Zander et al. | 280/736 |
| 5,087,070 | 2/1992 | O'Loughlin et al. | 280/740 |
| 5,139,280 | 8/1992 | Cord et al. | 280/741 |
| 5,201,542 | 4/1993 | Thuen et al. | 280/736 |
| 5,215,721 | 6/1993 | Tasaki et al. | 280/740 |

*Primary Examiner*—Kenneth R. Rice
*Attorney, Agent, or Firm*—George W. Rauchfuss, Jr.; Gerald K. White

[57] ABSTRACT

An integral airbag cushion retainer, filter and diffuser for use with an inflator assembly for generating inflation gas, a first filter material, a second filter material and an inflatable airbag cushion, as part of an inflatable restraint system. The integral airbag cushion retainer, filter and diffuser comprises a shaped plate member which has a top panel that joins to a filter chamber wall extending to a radially extending airbag cushion retaining ring. The shaped plate member fits over and encloses a portion of the inflator assembly comprising a plurality of gas exhaust openings, with the retaining ring attaching to the inflator assembly, retaining the airbag cushion therebetween in a gastight manner. A filter chamber, enclosing the gas exhaust openings and retaining the first filter material, is formed by the inflator assembly, the top panel and the filter chamber wall. An outer filter chamber, retaining the second filter material is formed by the filter chamber wall, the retaining ring and an outer filter chamber wall extending upwardly from the cushion retaining ring to an outer edge of the shaped plate member. The outer edge is either folded or crimped towards the top panel and filter chamber wall, retaining the second filter material within the outer filter chamber. A plurality of gas port openings in the filter chamber wall connect the filter chamber to the outer filter chamber, while the outer filter chamber has a gas delivery passage for delivering and diffusing generated gas into the airbag cushion.

23 Claims, 2 Drawing Sheets

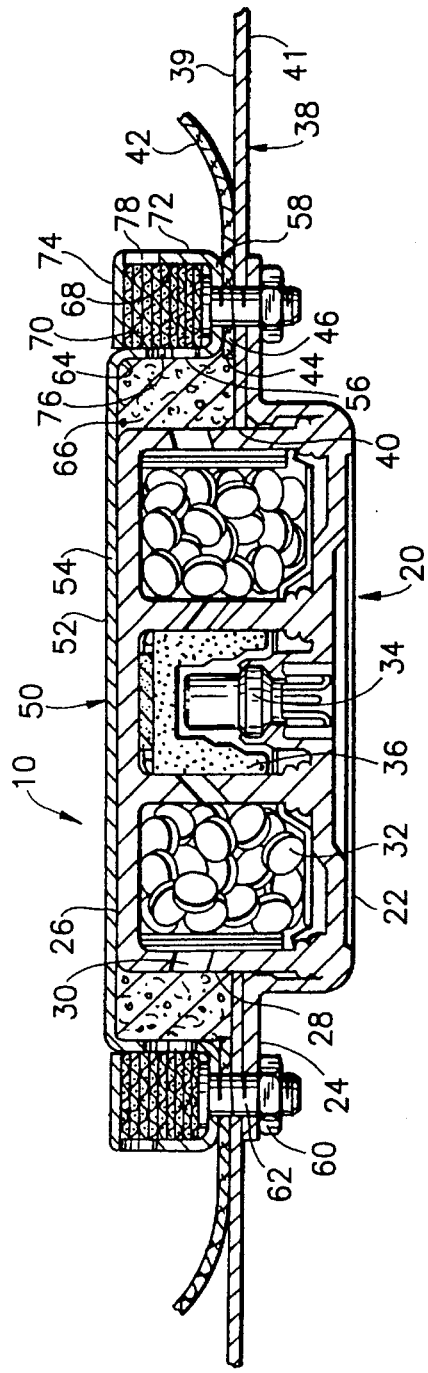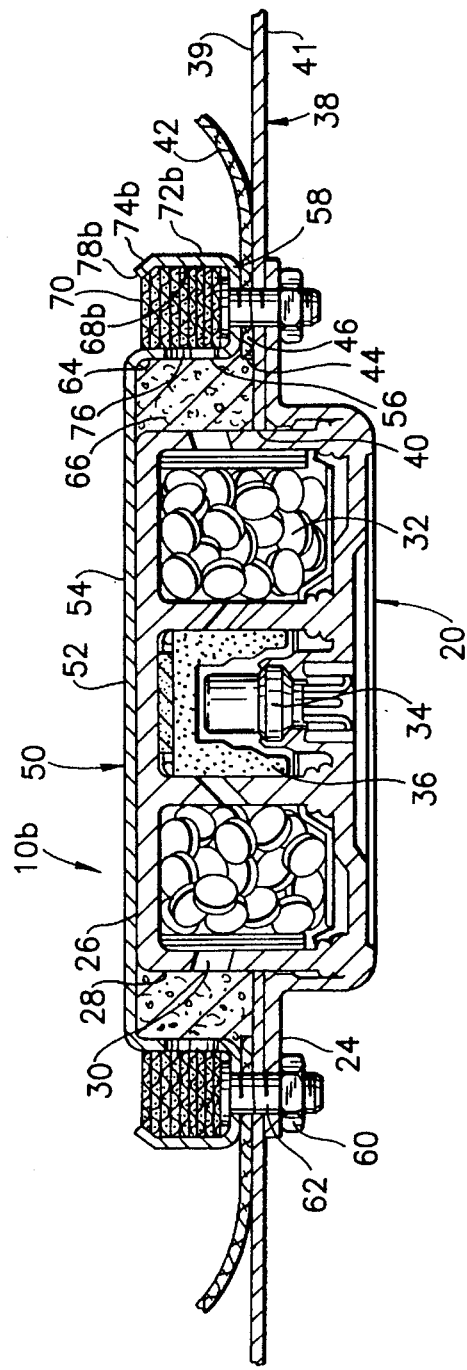

INTEGRAL AIRBAG CUSHION RETAINER, FILTER AND DIFFUSER

FIELD OF THE INVENTION

The present invention relates to an inflatable restraint system, and more particularly, to an integral airbag cushion retainer, filter and diffuser for use with such systems.

BACKGROUND OF THE INVENTION

Inflatable restraint systems have previously been used, and are intended for protecting an occupant of a vehicle against injury by physically restraining the occupant's body when the vehicle encounters a collision. Traditionally, inflatable restraint systems for use in automobiles have generally consisted of structural components and gas generant for instantaneously generating gas to inflate an inflatable airbag cushion. The gas generant is ignited by an ignitor connected to a remote deceleration sensor. One or more filters and a gas diffuser are also normally located between the gas generant and the airbag cushion.

Most current inflatable restraint systems comprise a number of separate components including a base plate, an inflator assembly, filter chambers, a diffuser, an inflatable airbag and an airbag retainer. These separate components are used in the systems shown and described in U.S. Pat. Nos. 5,201,542, 4,830,401 and 3,984,126. The inflator assembly contains the gas generant and ignitor, and generates the gas for inflating the airbag. One of the filter chambers normally holds an arrangement of metallic wire mesh and non-metallic fibers that absorbs heat from the generated gas and inhibits or prevents solid particles from passing through the filter chamber. The other filter chamber normally contains a screen material for preventing solid particles from entering the airbag cushion, while the diffuser meters and distributes the generated gas into the airbag.

Combining two or more of the filter chambers, a diffuser and a retainer ring into a integral unit would reduce manufacturing time, and the complexity and cost of an inflatable restraint system.

SUMMARY OF THE INVENTION

A principal object, therefore, of the present invention is to reduce the manufacturing time, complexity and cost of the inflatable restraint system.

A more specific object of the present invention is to reduce the number of steps required to assemble the inflatable restraint system.

In accomplishing these and other objects of this invention, an integral airbag cushion retainer, filter and diffuser for use as part of an inflatable restraint system is provided. The cushion retainer, filter and diffuser is incorporated as part of the inflatable restraint system along with an inflator assembly, a first filter material, a second filter material and an inflatable airbag cushion.

The inflator assembly comprises a canister containing means for generating inflation gas, and a peripheral bracket attached to the canister. The canister has a top wall and a cylindrical sidewall, and the sidewall defines a plurality of gas exhaust openings. The bracket is attached to the canister below the exhaust openings, which allow generated gas to exit the canister.

The integral airbag cushion retainer, filter and diffuser comprises a shaped plate member which has a top panel that is located above the top wall of the canister. The top panel joins to a filter chamber wall extending to a cushion retaining ring, which attaches to the peripheral bracket, defining a filter chamber surrounding the gas exhaust openings. The inflatable airbag cushion has an open mouth, formed by a marginal edge, which fits around the canister and filter chamber, with the marginal edge retained between the retaining ring and peripheral bracket so that the exhaust openings and filter chamber are located within the airbag cushion. The filter chamber retains a first filter material.

A second, outer filter chamber, retaining a second filter material, is formed by the filter chamber wall, the retaining ring and an outer filter chamber wall extending upwardly from the cushion retaining ring to an outer edge of the shaped plate member.

The filter chamber wall has a plurality of gas port openings connecting the filter chamber to the outer filter chamber. The outer filter chamber has a gas delivery passage for delivering and distributing generated gas into the airbag cushion from the inflator assembly, after the generated gas has first passed through the gas exhaust openings, the filter chamber, the gas port openings and the outer filter chamber.

According to one aspect of the present invention, the outer portion of the shaped plate member is folded to extend towards and contact the top panel and filter chamber wall, enclosing the second filter material within the outer filter chamber. In addition, the gas diffusing passage is comprised of a plurality of outlet openings in the outer filter chamber wall. This alternative allows the generated gas to exit the sides of the outer filter chamber, producing a radial flow of generated gas.

According to an alternative aspect of the present invention, the gas diffusing passage is comprised of an outlet channel formed between the outer edge of the shaped plate member and the top panel and filter chamber wall. In addition, the outer edge is crimped towards the top panel and filter chamber wall to retain the second filter material within the outer filter chamber. This alternative allows the generated gas to exit the top of the outer filter chamber, producing an axial flow of inflation gas.

Because the integral airbag cushion retainer, filter and diffuser includes the filter chambers, diffuser and cushion retainer, the inflatable restraint system can be assembled in fewer steps, thereby reducing the manufacturing time, complexity and cost of the system.

The invention together with further objects, features, advantages and aspects thereof, will be more clearly understood from the following description taken in connection with the accompanying drawings.

BRIEF DESCRIPTION OF THE DRAWINGS

FIG. 2 is a cross-sectional side view of the assembled inflatable restraint system of FIG. 1; and FIG. 3 is a cross-sectional side view of another inflatable restraint system of the present invention.

The same reference numerals refer to the same elements throughout the various figures.

DESCRIPTION OF THE PREFERRED EMBODIMENTS

Figure 1:
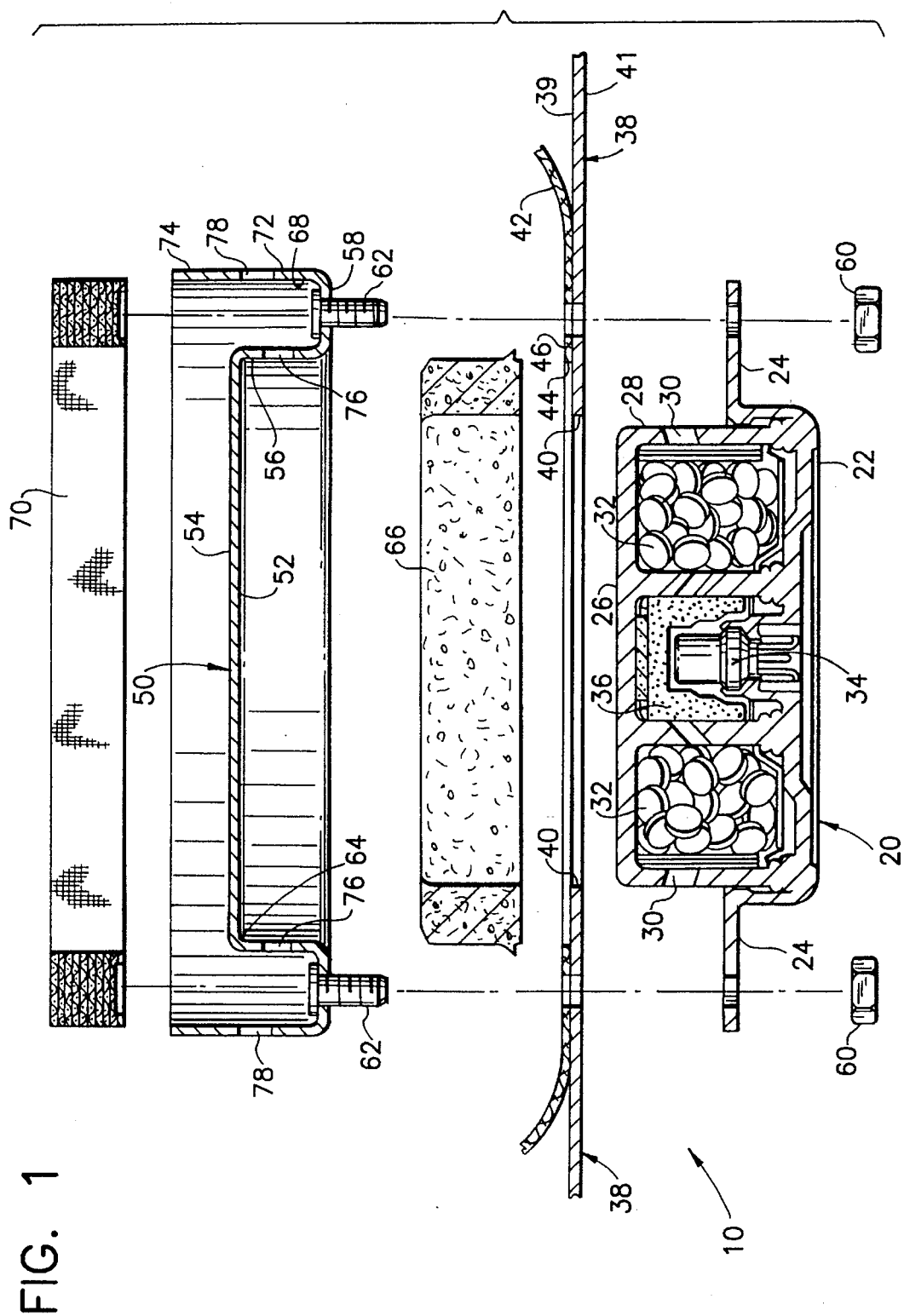
FIG. 1 is an exploded cross-sectional side view of an inflatable restraint system of the instant invention.

The present invention is directed to an integral airbag cushion retainer, filter and diffuser for use with an inflator assembly as part of an inflatable restraint system. The particular contents of an inflator assembly, how an inflator assembly generates gas necessary for inflating an airbag, the sensor means for initiating the inflator assembly and the method and hardware for mounting an inflatable restraint system in an automobile are all known in the art and, accordingly, are not described in detail as they do not in themselves constitute features of the present invention. Only the integral airbag cushion retainer, filter and diffuser, together with the components of an inflator assembly, module base plate and inflatable air bag that relate to the instant invention, will be described in detail.

Referring first to FIGS. 1 and 2, an integral air bag cushion retainer, filter and diffuser 50 is incorporated as part of an inflatable restraint system 10. The inflatable restraint system 10 includes a module base plate 38, an inflator assembly 20, a first filter material 66, a second filter material 70 and an inflatable airbag cushion 42.

The inflator assembly 20 comprises a canister 22 containing means for generating inflation gas, and a peripheral bracket 24 that extends radially outwardly from the canister 22. The means for generating gas includes a multiplicity of gas generant pellets 32, ignitor material 36 for igniting the gas generant pellets 32, and a squib or ignitor 34, connectable to and initiated by a remote sensor (not shown), for igniting the ignitor material 36. The canister 22 has a top wall 26 and a cylindrical sidewall 28, and the sidewall 28 defines a plurality of gas exhaust openings 30. The bracket 24 is attached to the canister 22 below the gas exhaust openings 30, which allow generated gas to exit the canister 22 between the bracket 24 and the wall 26.

The module base plate 38 has a top surface 39, a bottom surface 41 and an aperture 40 for receiving the canister 22. The canister 22 extends through the aperture 40, with the bracket 38 adjacent the bottom surface 41 of the base plate 22 so that the gas exhaust openings 30 are located above the top surface 39 of the base plate 38. The inflatable airbag cushion 42 has an open mouth 44, formed by a marginal edge 46. The open mouth 44 fits over the sidewall 28 of canister 22, so that the marginal edge 46 is adjacent the top surface 39 of the base plate 38.

The airbag cushion retainer, filter and diffuser 50 is a shaped plate member having a top panel 54 that is located above the top wall 26 of the canister 22 and preferably extends outwardly beyond the cylindrical sidewall 28 of the canister. The top panel 54 joins to a filter chamber wall 56 which extends downwardly to a radially extending cushion retaining ring 58. The cushion retaining ring 58 is adjacent the top surface 39 of the base plate 38, and a coupling means secures the cushion retaining ring 58, the base plate 22 and the bracket 38 together. As shown in FIGS. 1 and 2, the coupling means comprises a plurality of nuts 60 and bolts 62, extending through appropriately formed openings and retaining the marginal edge 46 of the airbag cushion 45 between the cushion retaining ring 58 and base plate 22 in a gastight manner. The coupling means may alternatively comprise welds, rivets or other suitable means. The airbag cushion retainer, filter and diffuser 50 is manufactured from a single sheet of metal, stamp forged into the described integral shape.

A filter chamber 64, which surrounds the gas exhaust openings 30 and retains the first filter material 66, is defined by the top panel 54, the sidewall 28, the base plate 38 and the filter chamber wall 56. The first filter material 66, covering the exhaust openings 30 is comprised of a heat sink material having an arrangement of metallic wire mesh and non-metallic fibers that absorbs heat from the combustion gases and inhibits or prevents solid particles from passing through the filter chamber 64.

An outer filter chamber 68, retaining a second filter material 70, is formed by the filter chamber wall 56, the cushion retaining ring 58 and an outer filter chamber wall 72 extending upwardly from the cushion retaining ring 58 to an outer marginal edge 74 of the shaped plate member 52. The outer marginal edge 74 is folded to extend towards and contact the top panel 54 at the filter chamber wall 56, enclosing the second filter material 70 within the outer filter chamber 68. The second filter material 70 is also comprised of a screen material for preventing solid particles from entering the airbag cushion 42.

The filter chamber wall 56 has a plurality of gas port openings 76 connecting the filter chamber 64 to the outer filter chamber 68. The outer filter chamber 68 has a gas delivery passage comprised of a plurality of outlet holes 78 defined in the outer filter chamber wall 72, for delivering and distributing generated gas into the airbag cushion 42 from the inflator assembly 20, after the generated gas has first passed through the gas exhaust openings 30, the filter chamber 64, the gas port openings 76 and the outer filter chamber 68. The inflatable restraint system 10 of the present invention, shown in FIGS. 1 and 2, produces a radial flow of generated gas.

Referring to FIG. 3, there is shown another inflatable restraint system 10b of the present invention, characterized by an alternative integral airbag cushion retainer, filter and diffuser 50b which produces an axial flow of generated gas. The gas delivery passage comprises an outlet channel 78b, for diffusing and delivering generated gas into the airbag cushion 42, formed between the outer marginal edge 74b of the shaped plate member 50b and the top panel 54 and filter chamber wall 56. The outer filter chamber wall 72b is a vertical upward extension of shaped plate member 52 from the cushion retaining ring 58, with the outer marginal edge 74b adjacent outer channel 78b being crimped toward the top panel 54 and the filter chamber wall 56 to retain the second filter material 70 within the outer filter chamber 68b.

The present invention may also include other changes and modifications without departing from its true spirit and scope. For example, the first and second filter materials 66, 70 may be comprised of many different heat sink, filter and screening materials and/or structures. In addition, the top panel 54 of the integral airbag cushion retainer, filter and diffuser 50 may not actually touch the canister 22, as long as the canister 22 above the top surface 39 of the base plate 38 is enclosed within the shaped plate member. Furthermore, the peripheral bracket 24, retaining ring 58, and module base plate 38 may be attached together in a different fashion. For example, the bracket 24 may be attached to the top surface 39 of the base plate 38, and the retaining ring 58 may be attached to the bracket 24, with the airbag cushion 42 being retained between the retaining ring 58 and the bracket 24. In fact, the inflatable restraint system 10 and 10b could be manufactured as a complete unit without the base plate and using an extended bracket for mounting.

Since other modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims and equivalents thereto.

What is claimed is:

1. An inflatable restraint system comprising:
   A) an inflator assembly including a canister containing means for generating inflation gas, the canister having a top wall, a generally cylindrical sidewall defining a plurality of gas exhaust openings, and a peripheral bracket extending radially outwardly from the cylindrical sidewall below the gas exhaust openings;
   B) an airbag cushion having an open mouth for receiving generated gas, the open mouth sized to receive the canister sidewall with a marginal edge of the airbag cushion defining the open mouth thereof received adjacent the peripheral bracket;
   C) an integral airbag cushion retainer, filter and diffuser comprising a shaped plate member having a top panel adjacent the top wall of the canister, a filter chamber wall extending from the top panel to adjacent the peripheral bracket and spaced from the sidewall, and an airbag cushion retaining ring extending from the filter chamber wall generally parallel to and adjacent the bracket;
   D) a filter chamber defined by the sidewall, bracket and filter chamber wall surrounding the gas exhaust openings, the filter chamber wall defining a plurality of gas outlet ports from the filter chamber, and a first filter material deployed in the filter chamber for filtering generated gas passing therethrough; and
   E) attachment means securing the retaining ring and the bracket together with the marginal edge of the airbag cushion defining its open mouth clamped therebetween in a gastight manner.

2. An inflatable restraint system as defined in claim 1, wherein the retaining ring extends radially outwardly from the filter chamber wall.

3. An inflatable restraint system as defined in claim 2, wherein the integral airbag cushion retainer, filter and diffuser further comprises an outer filter chamber wall extending upwardly from the retaining ring to an outer marginal edge of the shaped plated member, the filter chamber wall, retaining ring and an outer filter chamber wall defining an outer filter chamber having a gas delivery passage, and second filter material deployed in the outer filter chamber for filtering generated gas passing therethrough.

4. An inflatable restraint system as defined in claim 3, wherein the outer marginal edge of the shaped plate member is folded towards, and contacts the shaped plate at one of the top panels or filter chamber wall, thereby enclosing the second filter material within the outer filter chamber, the gas delivery passage comprising a plurality of outlet openings defined in the outer filter chamber wall.

5. An inflatable restraint system as defined in claim 4, wherein the first filter material comprises an arrangement of metallic wire mesh and non-metallic fibers.

6. An inflatable restraint system as defined in claim 5, wherein the second filter material comprises an arrangement of wire, cloth, ceramic or similar screen material.

7. An inflatable restraint system as defined in claim 6, wherein the means for generating inflation gas contained within the canister comprises an ignitor connectable to and initiated by a remote sensor, an ignitor material surrounding the ignitor, and a multiplicity of gas generant pellets surrounding the ignitor material.

8. An inflatable restraint system as defined in claim 3, wherein the gas delivery passage comprises an outlet channel defined between the outer marginal edge of the shaped plate member and the top panel and filter chamber wall, and the outer edge of the shaped plate member is crimped toward the top panel and filter chamber wall, retaining the second filter material within the outer filter chamber.

9. An inflatable restraint system as defined in claim 8, wherein the first filter material comprises an arrangement of metallic wire mesh and non-metallic fibers.

10. An inflatable restraint system as defined in claim 9, wherein the second filter material comprises an arrangement of screen material.

11. An inflatable restraint system as defined in claim 10, wherein the means for generating inflation gas contained within the canister comprises an ignitor connectable to and initiated by a remote sensor, an ignitor material surrounding the ignitor, and a multiplicity of gas generant pellets surrounding the ignitor material.

12. An inflatable restraint system comprising:
   A) an inflator assembly having a generally circular cylindrical canister containing means for generating inflation gas, the canister having a top wall, a generally cylindrical sidewall defining a plurality of gas exhaust openings, and a peripheral bracket extending radially outwardly from the cylindrical sidewall below the gas exhaust openings;
   B) a module base plate having a generally circular aperture for receiving the canister with said bracket adjacent said base plate, so that the canister extends through said aperture with said exhaust openings located above the bracket and the base plate;
   C) a first filter material surrounding the sidewall of said canister above the bracket and base plate and covering the gas exhaust openings;
   D) an inflatable airbag cushion having an open mouth for receiving generated gas, the open mouth sized to receive the canister sidewall and the first filter material, with a marginal edge of the airbag cushion defining the open mouth received adjacent the bracket and the base plate;
   E) an integral airbag cushion retainer, filter and diffuser comprising a shaped plate member having a top panel covering the top surface of the canister and extending over the first filter material, a filter chamber wall extending downwardly from the top panel, generally perpendicular to the top plate and generally parallel to the sidewall, to adjacent the base plate, an airbag cushion retaining ring extending radially outwardly from the filter chamber wall, generally perpendicular to the filter chamber wall and generally parallel to the base plate, an outer filter chamber wall extending upwardly from the cushion retaining ring, generally perpendicular to said retaining ring and generally parallel to said filter chamber wall and including an outer marginal edge of the shaped plate member;
   F) a filter chamber defined by the sidewall, base plate, filter chamber wall and top panel surrounding the gas exhaust openings and retaining the first filter material therein;
   G) an outer filter chamber defined by the filter chamber wall, the airbag cushion retaining ring and the outer filter chamber wall including the outer marginal edge thereof, a plurality of gas port openings in the filter chamber wall connecting said filter chamber to said outer filter chamber;
   H) a second filter material contained within said outer filter chamber, said outer marginal edge of the shaped plate member being folded to extend towards and contact said top panel and said filter chamber wall, enclosing said second filter material within said outer filter chamber, said outer filter chamber wall comprising a plurality of outlet openings for delivering and distributing generated gas into the airbag cushion from the inflator assembly, after generated gas has first passed through the gas exhaust openings, the filter chamber, the gas port openings and the outer filter chamber; and I) attachment means securing the airbag cushion retaining ring, the base plate and the bracket together, with the marginal edge of the airbag cushion defining its open mouth clamped between the retaining ring and the bracket in a gastight manner.

13. An inflatable restraint system as defined in claim 12 wherein the bracket is positioned below the base plate, and the base plate and marginal edge of the airbag cushion are clamped between the airbag cushion retaining ring and bracket.

14. An inflatable restraint system as defined in claim 12 wherein the base plate is positioned below the bracket, and the retaining ring, marginal edge of the airbag cushion, bracket and base plate are secured together by the attachment means.

15. An inflatable restraint system as defined in claim 12, wherein the first filter material comprises an arrangement of metallic wire mesh and non-metallic fibers.

16. An inflatable restraint system as defined in claim 13, wherein the second filter material comprises an arrangement of wire, cloth, ceramic or similar screen material.

17. An inflatable restraint system as defined in claim 14, wherein the means for generating inflation gas contained within the canister comprises an ignitor connectable to and initiated by a remote sensor, an ignitor material surrounding the ignitor, and a multiplicity of gas generant pellets surrounding the ignitor material.

18. An inflatable restraint system comprising:

A) an inflator assembly having a generally circular cylindrical canister containing means for generating inflation gas, the canister having a top wall, a generally cylindrical sidewall defining a plurality of gas exhaust openings, and a peripheral bracket extending radially outwardly from the cylindrical sidewall below the gas exhaust openings;

B) a module base plate having a generally circular aperture for receiving the canister with said bracket adjacent said base plate, so that the canister extends through said aperture with said exhaust openings located above the bracket and the base plate;

C) a first filter material surrounding the sidewall of said canister above the bracket and base plate and covering the plurality of gas exhaust openings;

D) an inflatable airbag cushion having an open mouth for receiving generated gas, the open mouth sized to receive the canister sidewall and the first filter material, with a marginal edge of the airbag cushion defining the open mouth received adjacent the bracket and base plate;

E) an integral airbag cushion retainer, filter and diffuser comprising a shaped plate member having a top panel covering the top surface of the canister and extending over the first filter material, a filter chamber wall extending downwardly from the top panel, generally perpendicular to the top plate and generally parallel to the sidewall, to adjacent the base plate, an airbag cushion retaining ring extending radially outwardly from the filter chamber wall, generally perpendicular to the filter chamber wall and generally parallel to the base plate, an outer filter chamber wall extending upwardly from the cushion retaining ring, generally perpendicular to said retaining ring and generally parallel to said filter chamber wall to an inwardly crimped outer marginal edge of the shaped plate member;

F) a filter chamber defined by the sidewall, base plate, filter chamber wall and top panel surrounding the gas exhaust openings and retaining the first filter material therein;

G) an outer filter chamber defined by the filter chamber wall, the cushion retaining ring and the outer filter chamber wall, with a plurality of gas port openings in the filter chamber wall connecting said filter chamber to said outer filter chamber;

H) a second filter material contained within said outer filter chamber and retained therein by said inwardly crimped outer marginal edge of said outer filter chamber wall, an outlet channel being formed between the outer edge and top panel and filter chamber wall, the outlet channel delivering and distributing generated gas into the airbag cushion from the inflator assembly after the generated gas has first passed through the gas exhaust openings, the filter chamber, the gas port openings and the outer filter chamber; and I) attachment means securing the airbag cushion retaining ring, the base plate and the bracket together with the marginal edge of the airbag cushion defining its open mouth clamped between the airbag cushion retaining ring and the bracket in a gastight manner.

19. An inflatable restraint system as defined in claim 18 wherein the bracket is positioned below the base plate, and the base plate and marginal edge of the airbag cushion are clamped between the airbag cushion retaining ring and bracket.

20. An inflatable restraint system as defined in claim 18 wherein the base plate is positioned below the bracket, and the retaining ring, marginal edge of the airbag cushion, bracket and base plate are secured together by the attachment means.

21. An inflatable restraint system as defined in claim 16, wherein the first filter material comprises an arrangement of metallic wire mesh and non-metallic fibers.

22. An inflatable restraint system as defined in claim 17, wherein the second filter material comprises an arrangement of wire, cloth, ceramic or similar screen material.

23. An inflatable restraint system as defined in claim 18, wherein the means for generating inflation gas contained within the canister comprises an ignitor connectable to and initiated by a remote sensor, an ignitor material surrounding the ignitor, and a multiplicity of gas generant pellets surrounding the ignitor material.

* * * * *